(12) United States Patent
Sugita

(10) Patent No.: US 6,564,048 B1
(45) Date of Patent: May 13, 2003

(54) RADIO COMMUNICATION SYSTEM AND METHOD AND MOBILE COMMUNICATION TERMINAL DEVICE

(75) Inventor: Takehiro Sugita, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/564,883

(22) Filed: May 4, 2000

Related U.S. Application Data

(62) Division of application No. 08/769,003, filed on Dec. 18, 1996, now Pat. No. 6,041,124.

(51) Int. Cl.⁷ .................................. H04B 3/36
(52) U.S. Cl. ................ 455/414; 455/418; 455/575
(58) Field of Search .................... 455/414, 566, 455/422, 418, 456, 575, 7; 340/825.44; 709/227

(56) References Cited

U.S. PATENT DOCUMENTS

| | | | |
|---|---|---|---|
| 5,838,252 A | * 11/1998 | Kikinis | 455/575 |
| 6,091,956 A | * 7/2000 | Hollenberg | 455/456 |
| 6,349,203 B1 | * 2/2002 | Asaoka et al. | 455/414 |
| 6,463,293 B1 | * 10/2002 | Guyot et al. | 455/466 |
| 6,493,758 B1 | * 12/2002 | McLain | 709/227 |

* cited by examiner

*Primary Examiner*—Thanh Cong Le
*Assistant Examiner*—Lana Le
(74) *Attorney, Agent, or Firm*—Jay H. Maioli

(57) ABSTRACT

In a radio communication system, efficient information provision services obtained, where various information is provided to mobile communication terminal devices separately from call services, update information on information to be provided is transmitted from a base station unit, and a mobile communication terminal device receives the update information and then receives the desired information upon confirming that the desired information has been updated. Consequently, due to the ability to easily determine whether or not the information to be provided has been updated, the mobile communication terminal device need not receive all the information or connect to an information service center, but can efficiently use the information provision services.

4 Claims, 10 Drawing Sheets

PAGING
CHANNEL

RECEIVING
OPERATION

PREPARATION  RECEIVING  PRO-PROCESSING
PERIOD       PERIOD

PAGING
CHANNEL

INFORMATION
INDEX PACKET

INFORMATION
SERVICE
CHANNEL

RECEIVING
OPERATION

PREPARATION  RECEIVING  RECEIVING      RECEIVING
PERIOD       PERIOD     INFORMATION    INFORMATION
                        INDEX PACKET   PACKET

PRO-PROCESSING

RADIO COMMUNICATION SYSTEM AND METHOD AND MOBILE COMMUNICATION TERMINAL DEVICE

This is a division of prior application Ser. No. 08/769,003 filed Dec. 18, 1996. Now U.S. Pat. No. 6,041,124.

BACKGROUND OF THE INVENTION

1. Field of the Invention

The present invention relates to a radio communication system and method and a mobile communication terminal device, and more particularly, is applicable to a code division multiple access (CDMA) cellular telephone system.

2. Description of the Related Art

Data transmissions using cellular telephone systems have been limited to computer communications executed by individual users using facsimile or modems, and there have been no information providing services for providing various information through a cellular network. This is partly because the cellular telephone system does not have a sufficient communication capacity. That is, all existing cellular telephone systems can do is to provide call services, and they do not have an extra communication capacity for providing other services.

In the United States, attempts are being made to standardize the CDMA cellular telephone system to initiate its services. The CDMA method has been used in new mobile communication systems such as personal communication service (PCS) systems, and it has been firmly believed that in the United States, this method will be most popular during the next generation.

The CDMA method is characterized by its communication capacity that is much larger than that of the conventional frequency division multiple access (FDMA) method. In the future, half or more of the 25 MHz frequency band assigned to existing cellular telephone systems and the 60 MHz frequency band assigned to the PCS system can be operated by the CDMA method to obtain a communication capacity about ten times as large as that of conventional methods. Thus, for CDMA cellular telephone systems, call services do not use up all the assigned frequency bands, and this system is expected to provide value-added services such as information provision.

The CDMA system has a large communication capacity, but its capacity is still smaller than that of cable communication networks. The communication capacity of the cable system can be increased easily by increasing the number of cables, whereas the code multiplexing capability and the number of frequency bands for the CDMA method are limited. Thus, the CDMA cellular telephone system must be efficient in providing services.

In addition, minimizing the charge for receiving services is important in spreading the services, so the amount of information that can be provided per frequency is desirably maximized to efficiently provide services.

Summary of the Invention

In view of the foregoing, objects of this invention are to provide a radio communication system and method and a mobile communication terminal device which can efficiently provide information services.

The foregoing objects and other objects of the invention have been achieved by the provision of a radio communication system and method and a mobile communication terminal device, wherein if various information is provided to the mobile communication terminal device separately from call services, update information on the information to be provided is transmitted from a base station, and the mobile communication terminal device receives the update information to examine whether or not the desired information has been updated, and if so, receives the desired information.

Since the update information is transmitted as described above, the mobile communication terminal device can easily examine whether or not the information to be provided has been updated. If whether or not the information has been updated can be determined, the information can be received only when it has been updated, and there will be no need to receive unwanted information or to connect to an information service center. Consequently, efficient information provision services can be provided.

In addition, according to the present invention, information to be transmitted using a code channel exclusively used to provide information is scrambled. Since information to be provided is scrambled, it can be received only by authorized mobile communication terminal devices.

In addition, according to the present invention, frequently received information is repeatedly transmitted by using the exclusive information-providing code channel while infrequently received information is transmitted by using a traffic channel by connecting the mobile communication terminal device and the information service center that provides information. And as update information, an index packet is transmitted, which includes the type of information to be provided, the version number of the information, and identification information that identifies whether the information is repeatedly transmitted by using the exclusive information-providing code channel or is transmitted by connecting to the information service center. The mobile communication terminal device examines whether or not the desired information has been updated, and if so, receives the exclusive information-providing code channel or connects to the information service center in order to obtain the desired information. Since frequently received information is transmitted through the exclusive information-providing channel while infrequently received information is transmitted by connecting to the information service center, the radio channels can be efficiently used to provide information, thus efficient information provision services as required can be provided.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Summary of the Invention

First, a summary of the present invention will be described. Although cable telephone networks enable information to be provided by one-to-one communications, this method is inefficient in providing information required by a large number of people. When, for example, information on a weather forecast or the current time is to be obtained, a single user occupies a single channel, resulting in degraded efficiency.

On the contrary, cellular telephone systems comprise radio networks, so that the same information can be provided to a large number of users at a time by using a common radio channel.

This invention attempts to make the most of these advantages of the cellular telephone system and the advantage of the CDMA method that it enables the communication capacity to be increased in order to efficiently provide information.

This invention thus periodically transmits update information on information to be provided (specifically, the type of the information and its version numbers that is a revision number) by using a paging channel or an exclusive code channel according to the CDMA method, and a mobile terminal device receives the update information to examine whether or not the desired information has been updated. On determining that the desired information has been updated, the mobile terminal device receives a code channel exclusively used to provide information or connects to the information service center in order to download the information. By providing information in this manner, this invention realizes efficient information provision services.

(2) Summary of CDMA Cellular Telephone Systems

For convenience of explanation, a general CDMA cellular telephone system (hereafter, referred to as CDMA cellular) will be described. The CDMA cellular described herein includes PCS systems.

The CDMA cellular uses the same frequency channel to multiplex a plurality of code channels that is transmitted by each base station unit. For a forward link (from the base station unit to the mobile terminal device), a pilot channel, a sync channel, a paging channel, and a traffic channel are provided as the code channels.

The pilot channel repeatedly sends only pseudo noise (PN) codes rather than data and is used to obtain and maintain synchronism at the mobile terminal device and to reproduce a clock. The sync channel is used to match time information and a PN code having a long period between the base station unit and the mobile terminal device. The paging channel is used to transmit information required for handoff, information used to call a terminal on the arrival of a call, or information on the assignment of the traffic channel. The traffic channel is used to transmit speech data during call and to transmit information data during data transmission.

Figure 1:
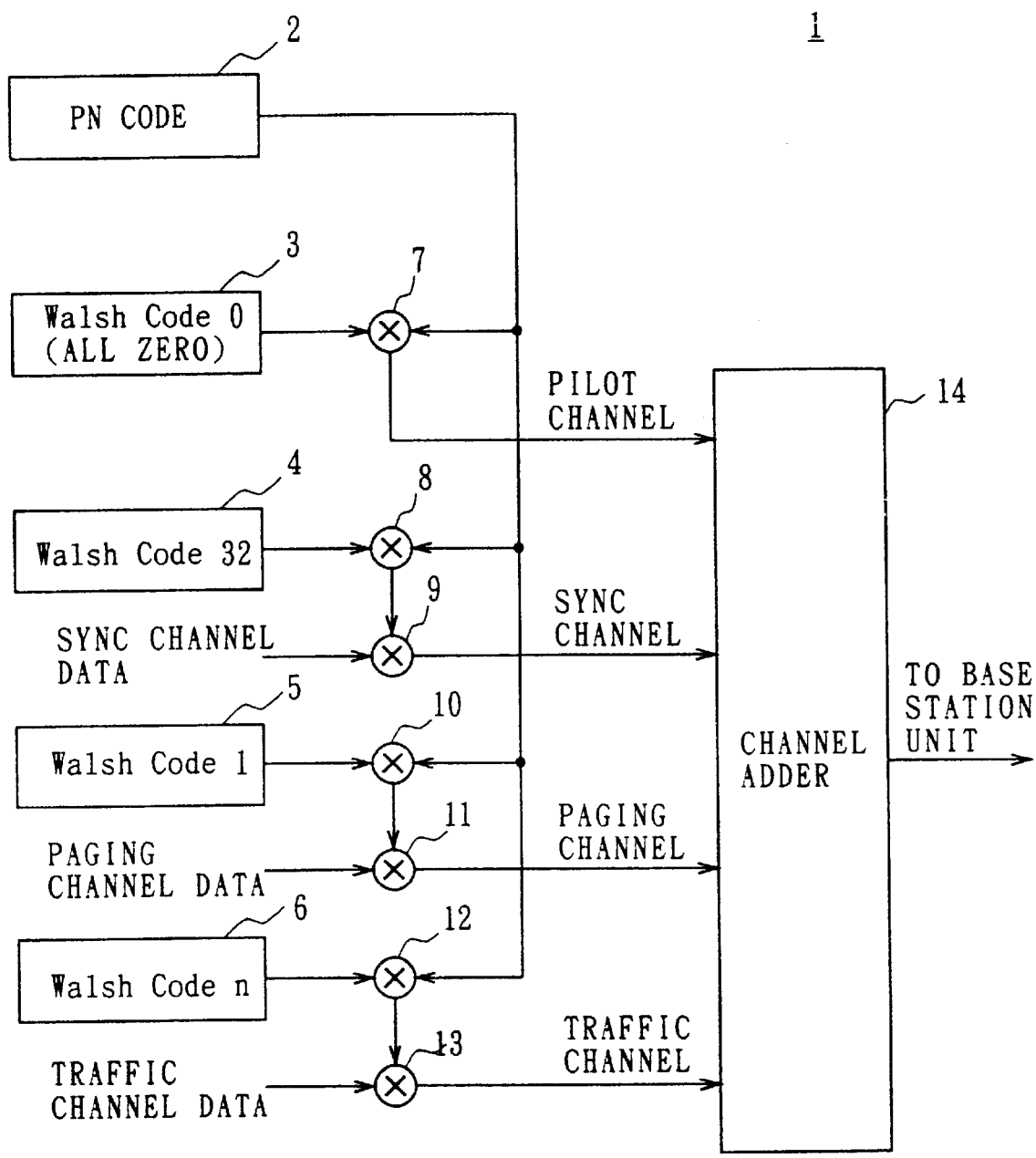
FIG. 1 is a block diagram showing a transmission section in a general CDMA cellular base station unit.

FIG. 1 shows a transmission section in a base station unit for transmitting these code channels. The transmission section 1 multiplies four code channel data by different spreading codes to generate code channels, then the code channels are added together by using a channel adder 14 to be multiplexed. These code channels are ultimately transmitted on the same frequency channel. In this case, the spreading code is formed by multiplying a PN code and a Walsh code together, and varied by changing the Walsh code ("0", "32", "1" or "n") for each code channel.

For example, the traffic channel uses a spreading code formed by multiplying the PN code and the Walsh code of function code "n", and this spreading code is multiplied by the traffic channel data to generate the traffic channel. The paging channel uses a spreading code formed by multiplying the PN code and the Walsh code of function code "1", and this spreading code is multiplied by the paging channel data to generate the paging channel. The sync channel uses a spreading code formed by multiplying the PN code and the Walsh code of function code "32", and this spreading code is multiplied by the sync channel data to generate the sync channel.

However, the pilot channel uses a spreading code formed by multiplying the PN code and the Walsh code of function code "0" (which is always zero), and this spreading code is directly sent out as the pilot channel. So, in the pilot channel, the PN code is sent as it is. Thus, the detection of the PN code by the mobile terminal device means the examination of the timing of the spreading code which is transmitted by using the pilot channel. In addition, the mobile terminal device can demodulate the desired code channel data by selectively switching the spreading code generated by the PN code generator, according to the sender (however, data cannot be obtained from the pilot channel, as described above).

Figure 2:
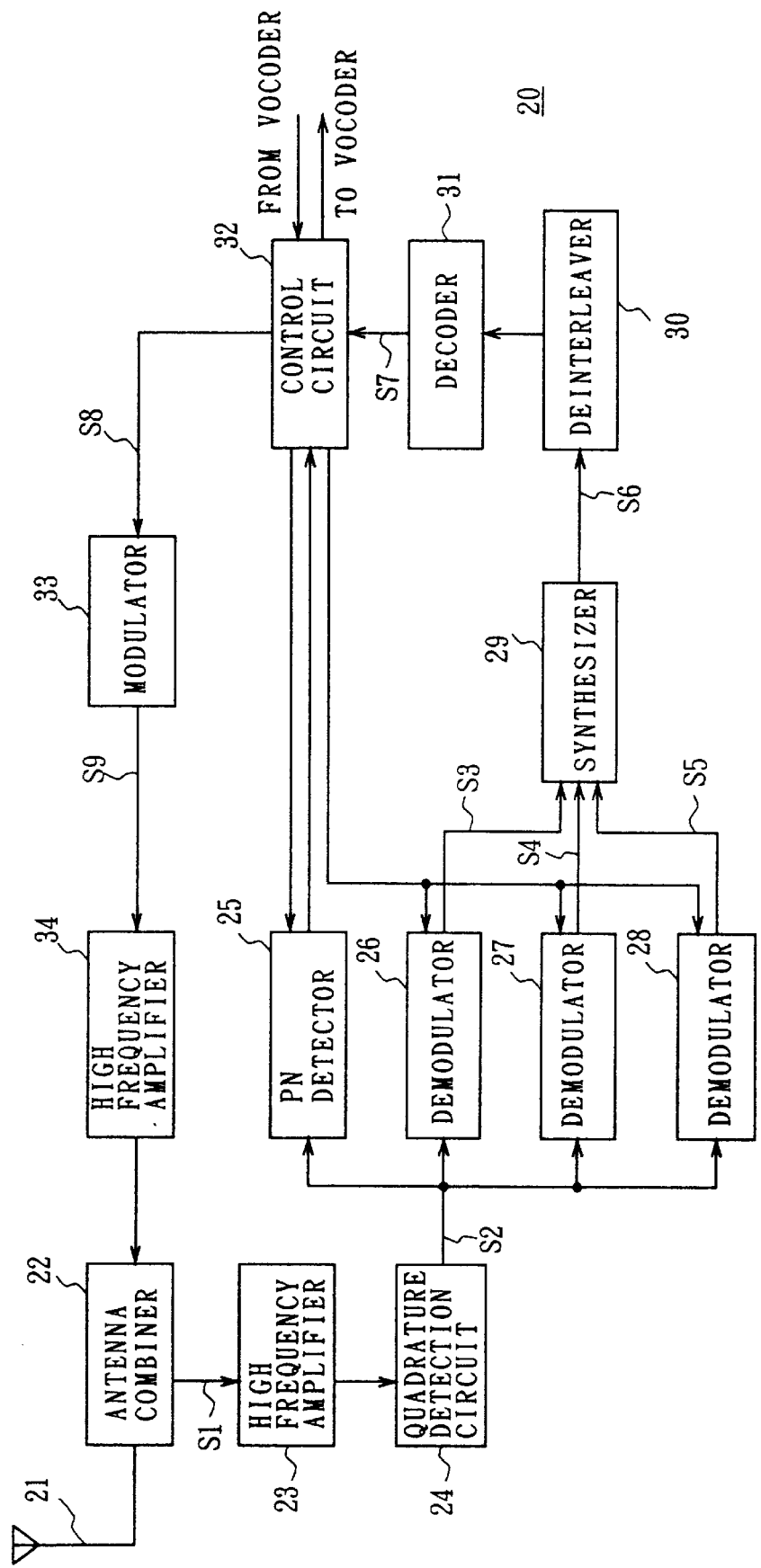
FIG. 2 is a block diagram showing a general CDMK cellular mobile terminal device.

FIG. 2 shows the configuration of a general mobile terminal device. In a mobile terminal device 20, a received signal S1 received by an antenna 21 is supplied via an antenna combiner 22 to a high frequency amplifier 23 in order to amplify the received signal S1. Then the amplified signal is supplied to an quadrature detection circuit 24. The quadrature detection circuit 24 applies quadrature detection to the received signal S1 to obtain a baseband signal S2, and supplies the baseband signal S2 to a PN detector 25 and demodulators 26 to 28.

In response to an instruction from a control circuit 32, the PN detector 25 detects a pilot PN code from the baseband signal S2, and communicates the detection results (such as the timing of the PN code) to the control circuit 32. In response to this, the control circuit 32 sends out a control signal to the demodulators 26 to 28 so as to operate them with the respective timings of the plurality of PN codes detected by the PN detector 25. The demodulators 26 to 28 are operated with the different timings because, in general, multiple paths are present in the transmission path and the PN code is detected with the plurality of timings. Thus, if the multiple paths are present, a plurality of demodulators are operated with different timings according to the number of paths to execute demodulation in order to avoid the effects of the multiple paths.

The demodulation results (S3 to S5) respectively obtained by the demodulators 26 to 28 are supplied to a synthesizer 29, wherein the demodulation results are added together with an appropriate timing. This allows the demodulation of received data S6 of a large noise resistance ratio and a large interference resistance ratio. The received data S6 is supplied to a deinterleaver 30, wherein the received data S6 is rearranged in the original order and then supplied to a decoder 31. The decoder 31 applies Viterbi decoding to the received data and corrects errors therein to obtain received data S7. The received data S7 is supplied via the control circuit 32 to a voice coding/decoding unit, that is, a vocoder (not shown), wherein it is decoded into an audio signal. The control circuit 32 controls the overall operation of the mobile terminal device 20 such as sending and receiving processing.

On the other hand, during transmission, speech data S8 output from the vocoder is supplied via the control circuit 32 to a modulation section 33, wherein modulation such as spread spectrum or offset quadrature phase shift keying (QPSK) is applied to the data. The obtained transmitted data S9 is supplied to a high frequency amplifier 34, wherein it is amplified and then supplied to the antenna 21 via the antenna combiner 22. Then the signal is radiated toward the base station unit.

Figure 3A:
FIGS. 3A and 3B are schematic diagrams showing the timing of the receiving operation of the mobile terminal device.
Figure 3B:

FIGS. 3A and 3B show the receiving operation timing of the mobile terminal device 20 during its idle state (that is, waiting state). During the idle state, the mobile terminal device 20 monitors the paging channel to check a paging message for itself. The paging message is periodically transmitted from the base station unit. The paging message must have a period of 1.28×20 seconds (1≦N).

The mobile terminal device 20 intermittently operates the circuit in its receiving system to receive the intermittently transmitted paging message in order to reduce power consumption during the idle state. In this case, to receive a reception slot including the paging message, the mobile terminal device 20 activates the circuit in its receiving system with a timing somewhat prior to a reception slot to receive the paging message, as shown in FIG. 3B. After reception has been finished, processing is executed according to the paging message, and if no further processing is required, the circuit in the receiving system is stopped and waits for the next reception.

(3) Information Provision Services According to the Embodiment

Relative to the CDMA cellular described above, this embodiment provides efficient information services by carrying out the following operation.

First, the base station unit transmits an information index packet indicating whether or not information to be provided (for example, information on stocks or a weather forecast) is updated. The information index is transmitted by using the paging channel. In addition, the base station unit transmits an information service packet which is the information to be provided, by using the exclusive service provision code channel or the traffic channel. The base station unit executes transmission by using the exclusive code channel if the information to be provided is likely to be frequently downloaded, whereas it executes transmission by using the traffic channel by connecting the mobile terminal device and the information service center if the information to be provided is unlikely to be frequently downloaded.

Figure 4:
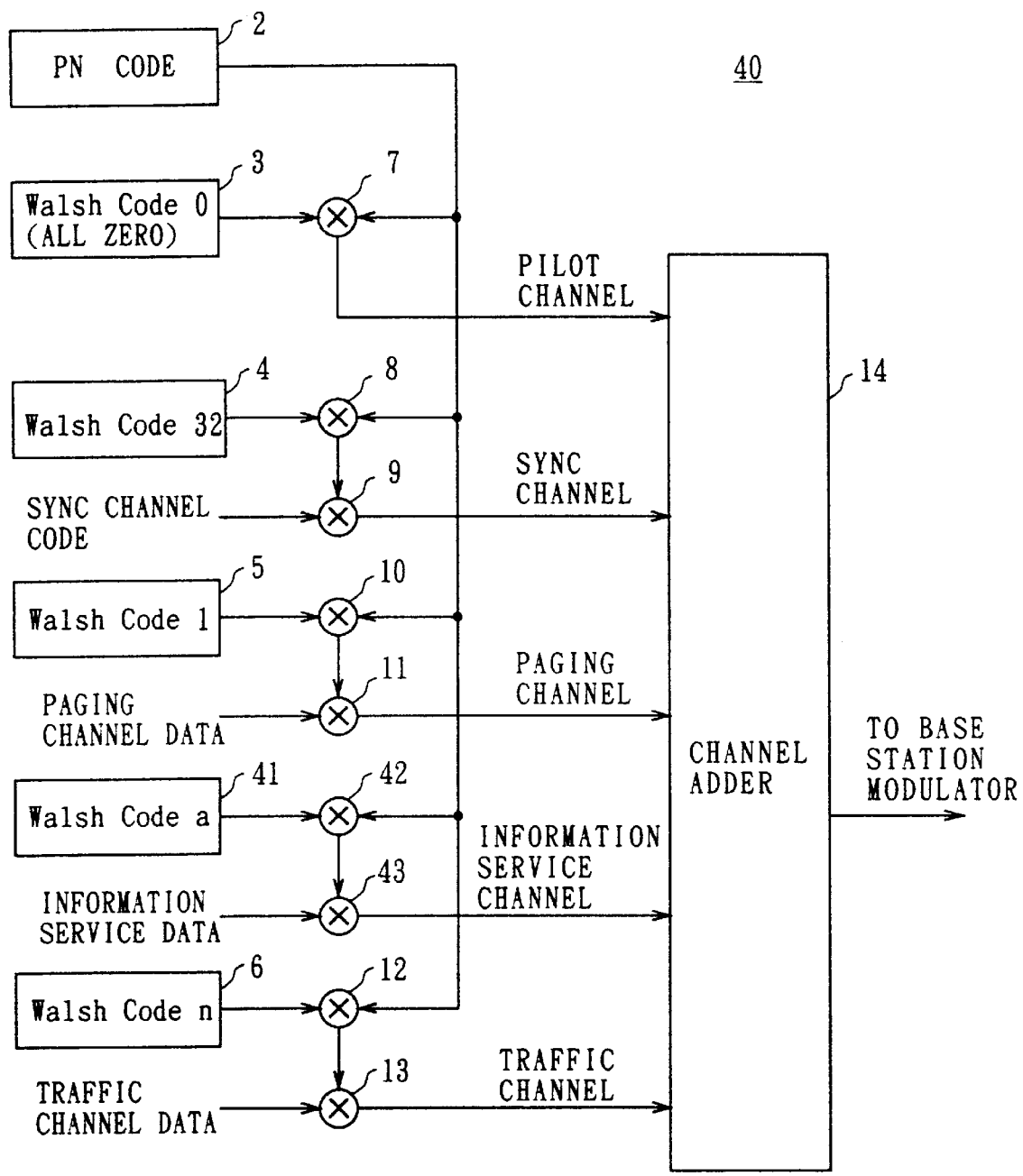
FIG. 4 is a block diagram showing a transmission section in a base station unit according to an embodiment.

In fact, in the base station unit, a transmission section 40 shown in FIG. 4 executes the above operation. The transmission section 40 uses the paging channel to transmit information index data, indicating whether or not the information service data has been updated, as the information index packet. In addition, the transmission section 40 uses an exclusive information service channel to transmit the information service data as the information service packet if the information service data is frequently downloaded, whereas it uses the traffic channel to transmit the information service data as the information service packet if the data is unlikely to be frequently downloaded.

On the other hand, the mobile terminal device receives the information index packet between the receptions of the paging message. In this case, the mobile terminal device receives the paging message once per several minutes and the information index packet at a longer interval (for example, once per ten minutes). Thus, in this case, the reception of the information index packet does not cause the waiting time to be significantly reduced.

Based on the received information index packet, the mobile terminal device examines whether or not the information service packet has been updated. If so, the information service channel is received or the information service packet is received by connecting to the information service center, in order to obtain the information service data provided therein.

Figure 5A:
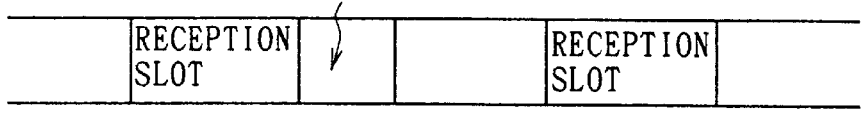
FIGS. 5A to 5C are schematic diagrams showing the timing of the receiving operation of the mobile terminal device according to the embodiment.
Figure 5B:
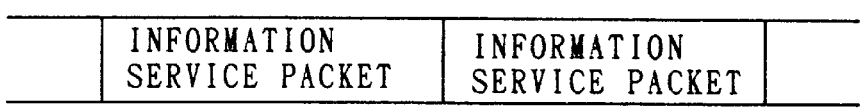
Figure 5C:
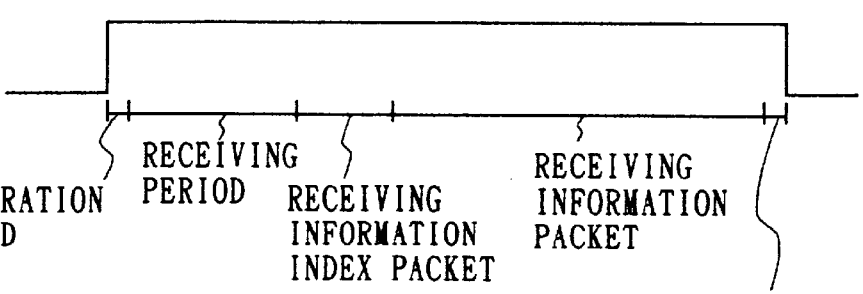

FIGS. 5A to 5C show the receiving operation timing of the mobile terminal device. The FIGS. 5A to 5C show the case where the information service packet is transmitted by using the information service channel.

First, the mobile terminal device receives reception slots for itself which are periodically sent to examine whether or not there is a paging message for itself. In this case, which reception slot carries the paging message for the mobile terminal device is determined by the ID number of the mobile terminal device, and the terminal device activates the circuit in its reception system with the timing of the predetermined reception slot to receive the paging message.

If there is no paging message for the mobile terminal device and the current timing is for receiving the information index packet, the mobile terminal device continues to receive the paging channel to receive the information index packet. The mobile terminal device judges based on the received information index packet whether or not the information service packet has been updated.

Figure 6:
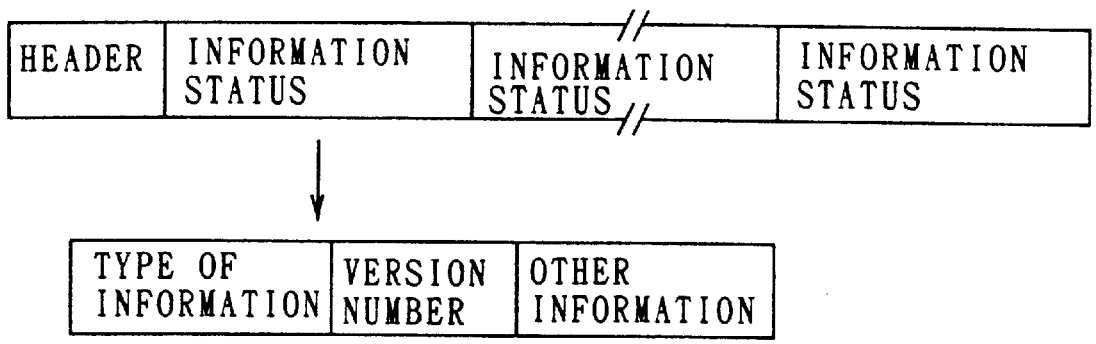
FIG. 6 is a schematic diagram showing the configuration of an information index packet.

In this case, the information index packet comprises a header and one or more information statuses, as shown in FIG. 6, and the type of information and the version number in the information status therein enable the determination of whether or not the desired information service packet has been updated.

There are a code in the type of information section which indicates which information service packet relates to a particular information status, and a code in the version number section which indicates the update information on the information service packet. There is also a code in the other information section which relates to the code channel through which the information service packet is transmitted (specifically, a code for identifying whether it is transmitted through the exclusive code channel or through the traffic channel by connecting to the information service center). When it is sent through the exclusive code channel, the packet includes a code indicating the channel number of this code channel.

Figure 7:
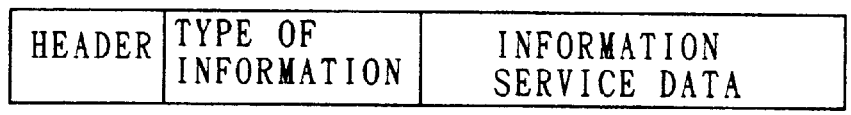
FIG. 7 is a schematic diagram showing the configuration of an information service packet.

On finding as a result of the above determination that the information has been updated (however, assume herein that the information service packet has been transmitted through the exclusive code channel), the mobile terminal device switches the channel to be received from the paging channel to the information service channel to receive the information service packet. This enables the mobile terminal device to receive the provided information service data. The information service packet comprises a header, the type of information, and information service data, as shown in FIG. 7, and the mobile terminal device downloads the information service data after confirming that the data is as desired by examining the type of information. If, for example, information on stocks is received, the mobile terminal device downloads the information after confirming that the information is on stocks by checking the type of information.

Figure 8:
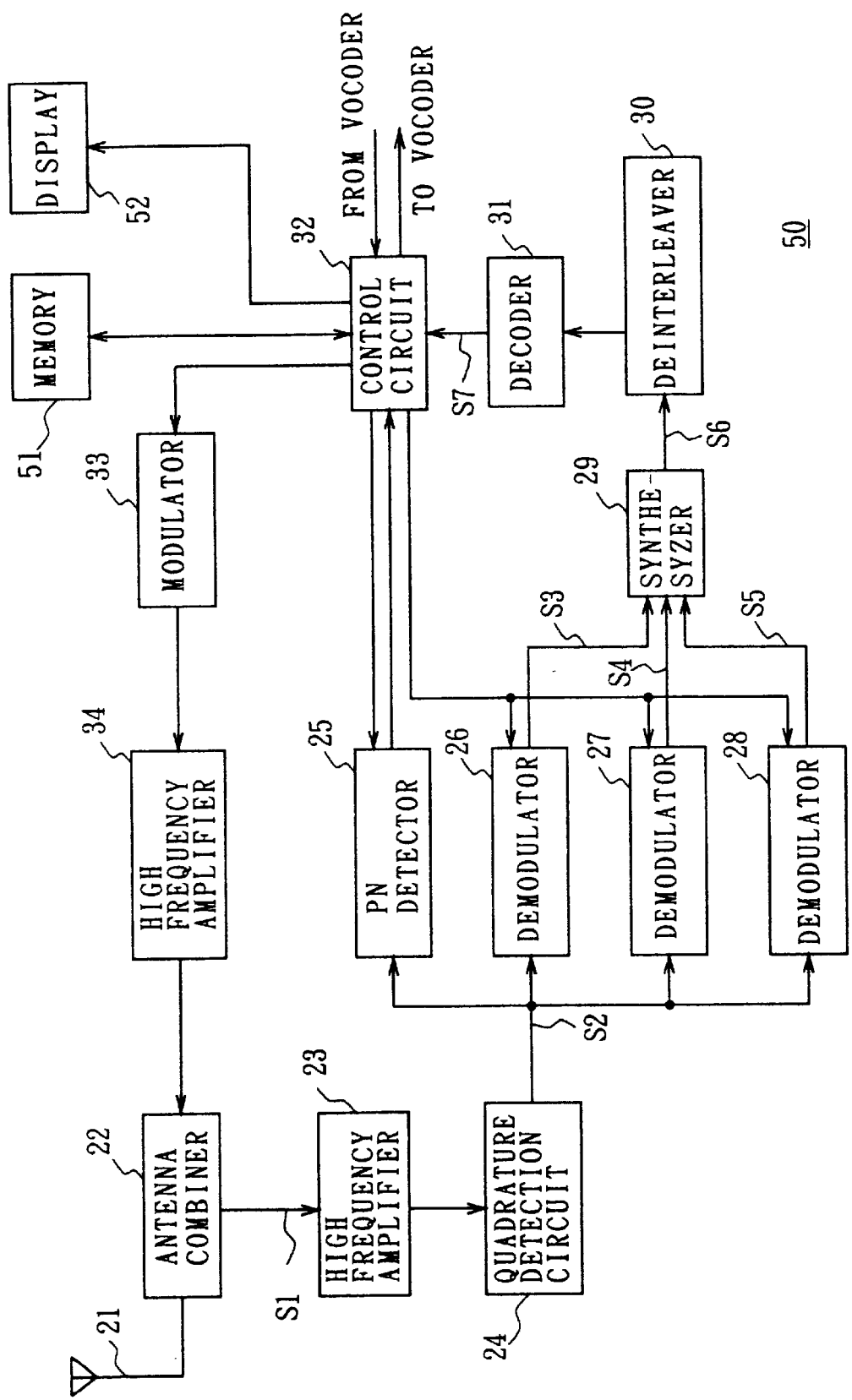
FIG. 8 is a block diagram showing the configuration of the mobile terminal device according to the embodiment.

The downloaded information service data is stored in a specified memory and displayed on a predetermined display. Thus, as shown in FIG. 8, in which those components which are the same as in FIG. 2 have the same reference numerals, a mobile terminal device 50 according to this embodiment has a memory 51 and a display 52 (for example, a liquid crystal display). In this case, an information service packet output from the decoder 31 is supplied to the control circuit 32. The control circuit 32 extracts information service data from the information service packet and supplies it to the memory 51 to store it therein. If the information service data is displayed on the display 52, the control circuit 32 reads the information service data from the memory 51 and supplies it to the display 52 to display it thereon.

Since the downloaded information service data is displayed on the display 52, the user can know provided information such as stocks or a weather forecast.

If the information service packet is not being transmitted through the information service channel, the mobile terminal device uses the access channel to execute a dialing procedure as in normal telephone calls to connect to the information service center, thereby receiving the information service packet to obtain the information service data.

Whether the information service packet is repeatedly transmitted through the exclusive code channel or transmitted by connecting to the information service center depends on the frequency of the downloading of the information to be provided. Specifically, frequently downloaded information is transmitted through the exclusive code channel, while infrequently downloaded information is transmitted by connecting to the information service center.

This is because if infrequently downloaded information is transmitted through the exclusive code channel, this channel is wastefully occupied to degrade its efficiency and because if frequently downloaded information is transmitted by connecting to the information service center, the traffic channel is occupied for information provision services to affect call services. Consequently, this embodiment transmits frequently downloaded information through the exclusive code channel while transmitting infrequently downloaded information by connecting to the information service center, thereby efficiently using the radio channels to efficiently provide information.

Figure 9:
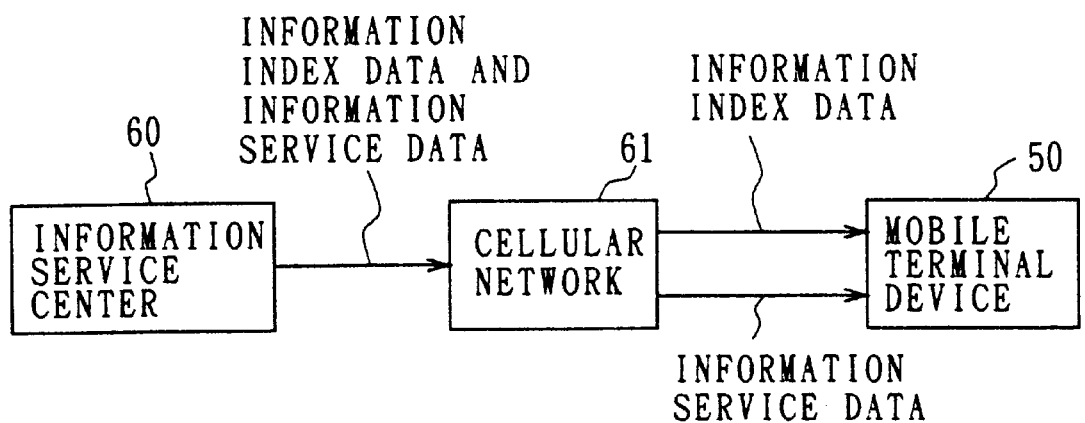
FIG. 9 is a schematic diagram explaining the transmission of information service data by using an exclusive code channel.

Next, the flow of information service data will be described with reference to FIGS. 9 and 10. In the case where the exclusive code channel (that is, the information service channel) is used to repeatedly transmit information service data, information index data and information service data are supplied from an information service center 60 to a cellular network 61, as shown in FIG. 9. In response to this, the cellular network 61 activates the base station unit and repeatedly transmits the information index data by using the paging channel and the information service data by using the information service channel which is the exclusive code channel. The mobile terminal device 50 receives the information index data as described above, and examines it to receive the information service data when the data need be downloaded.

Figure 10:
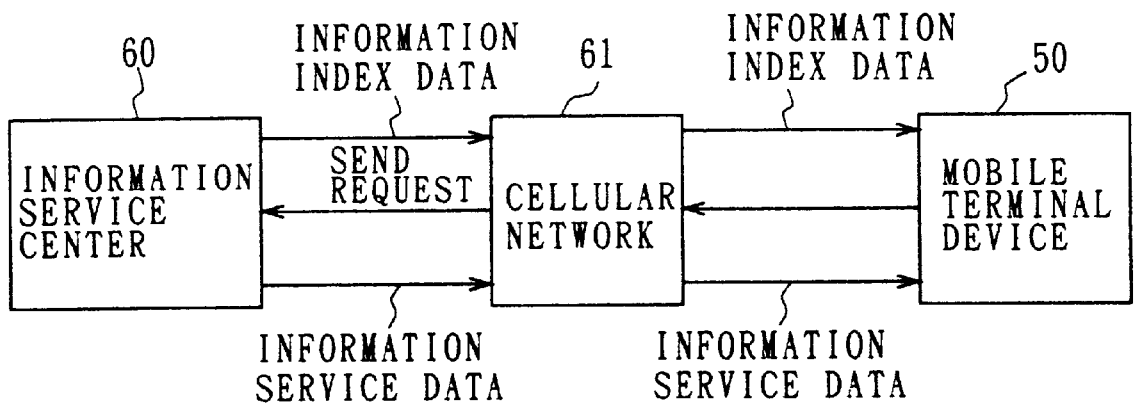
FIG. 10 is a schematic diagram explaining the transmission of information service data by connecting to an information service center.

On the other hand, in the case where the information service data is transmitted by connecting to the information service center, only the information index data is supplied from the information service center 60 to the cellular network 61, as shown in FIG. 10. In response to this, the cellular network 61 activates the base station unit and repeatedly transmits the information index data through the paging channel. The mobile terminal device 50 receives the information index data as described above and examines it. If the data need be downloaded, the mobile terminal device 50 connects to the information service center 60 via the cellular network 61 to send out a send request through this channel. In response to this, the information service center 60 transmits the information service data through the channel. This enables the mobile terminal device 50 to download the information service data.

Figure 11:
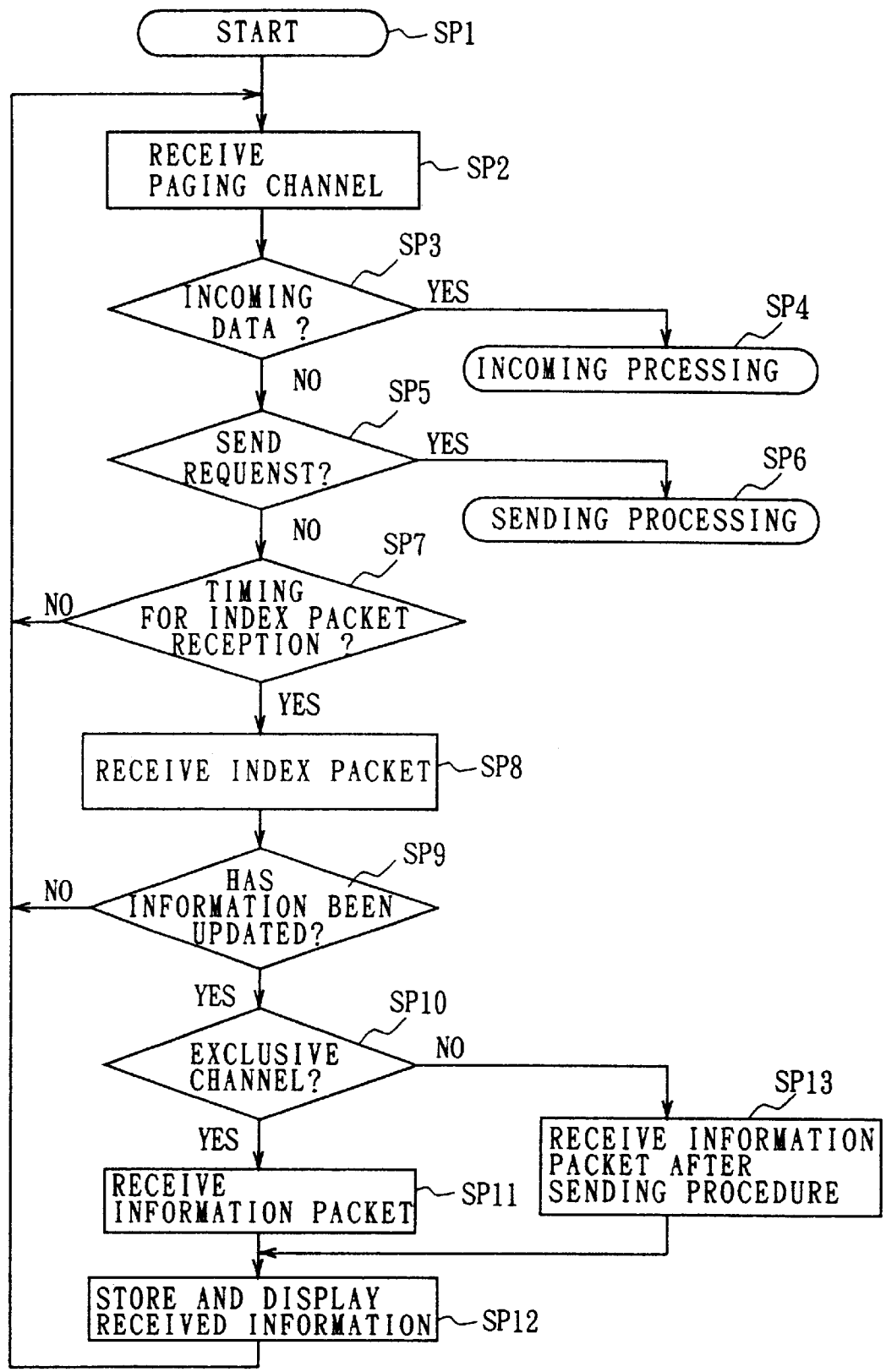
FIG. 11 is a flowchart showing the operational procedure of the mobile terminal device according to the embodiment.

Next, the operational procedure used by the mobile terminal device 50 will be described with reference to the flow chart shown in FIG. 11. As shown in FIG. 11, the mobile terminal device 50 initiates the process at step SP1, and receives the paging channel to examine whether or not there is a paging message for itself at step SP2. If so, the mobile terminal device 50 proceeds to the subsequent step SP3 to check the contents of the message to examine whether there is incoming data for itself. If so, the mobile terminal device 50 proceeds to step SP4 to execute incoming processing.

If there is no incoming data, the mobile terminal device 50 proceeds to the subsequent step SP5 to examine whether or not there is a send request from a user. If so, it proceeds to step SP6 to execute sending processing and otherwise, proceeds to step SP7.

In step SP7, the mobile terminal device 50 examines whether the current timing is for receiving the information index packet, and if not, returns to step SP2 to provide for the reception of the paging message, whereas otherwise, it proceeds to step SP8.

In step S8, the mobile terminal device 50 receives the paging channel to receive the information index packet. In the subsequent step SP9, the mobile terminal device 50 examines the desired information status in the received information index packet to examine whether or not the version number of the desired information service has been updated. As a result, if the version number of the information previously downloaded and the version number of the information service match, the mobile terminal device 50 determines that the information has not been updated and returns to step SP2, whereas if the version number of the information service differs from that of the previously downloaded information, it determines that the information has been updated and proceeds to step SP10.

In step SP10, the mobile terminal device 50 checks the other information in the information status to examine whether the information is being transmitted by using the exclusive code channel (that is, the information service channel) or by using the traffic channel by connecting to the information service center. As a result, if the information is being transmitted by using the exclusive code channel, the mobile terminal device 50 proceeds to step SP11 to switch the channel to be received to the information service channel, thereby receiving the information service packet to obtain the information service data. Then in the subsequent step SP12, the mobile terminal device 50 stores the information service data in the memory 51 and displays it on the display 52 to inform the user of the reception. Once this process has been finished, the mobile terminal device 50 returns to step SP2 to repeat the process.

On the other hand, when the mobile terminal device 50 determines at step SP10 that the information is being transmitted by connecting to the information service center, it proceeds to step SP13 to carry out the dialing procedure in order to connect to the information service center, thereby receiving the information service packet which is sent over the traffic channel to obtain the information service data. The mobile terminal device 50 subsequently proceeds to step SP12 to execute the same process to store and display the information service data.

In the above configuration and the information provision service according to this embodiment, the information index packet indicating whether or not the information to be provided has been updated is transmitted from the base station unit by using the paging channel. The mobile terminal device 50 receives this information index packet between the receptions of the paging message to examine whether or not the desired information has been updated. If so, the mobile terminal device 50 receives the information service channel or connects to the information service center to receive the information service packet, in order to obtain the desired information service data.

In this embodiment, since the information index packet indicating whether or not the information has been updated is transmitted, the mobile terminal device 50 can easily examine whether or not the information has been updated. Therefore, the mobile terminal device 50 must receive only updated information, and does not always have to receive the information service channel or to connect to the information service center. Thus the mobile terminal device 50 can use information provision services efficiently.

In addition, according to this embodiment, frequently downloaded information is sent by using the information service channel which is an exclusive code channel, so information much in demand can be efficiently transmitted. If frequently downloaded information is sent by connecting to the information service center, the information provision service may occupy the traffic channel to affect call services. However, this embodiment can avoid this problem to enable the radio channels to be efficiently used.

In addition, infrequently downloaded information is sent by using the traffic channel by connecting to the information service center, so information less in demand can be efficiently transmitted. If infrequently downloaded information is repeatedly sent by using the exclusive code channel, this code channel is wastefully occupied. However, this embodiment can avoid this problem to enable the radio channels to be efficiently used.

In the above configuration, the base station unit transmits the information index packet indicating whether or not the information to be provided has been updated, so the mobile terminal device 50 must receive only updated information service data, and can efficiently use information provision services. In addition, frequently downloaded information is sent by using the exclusive code channel, while infrequently downloaded information is transmitted by connecting to the information service center, thus the radio channels can be efficiently used to provide information.

(4) Other Embodiments

Figure 12:
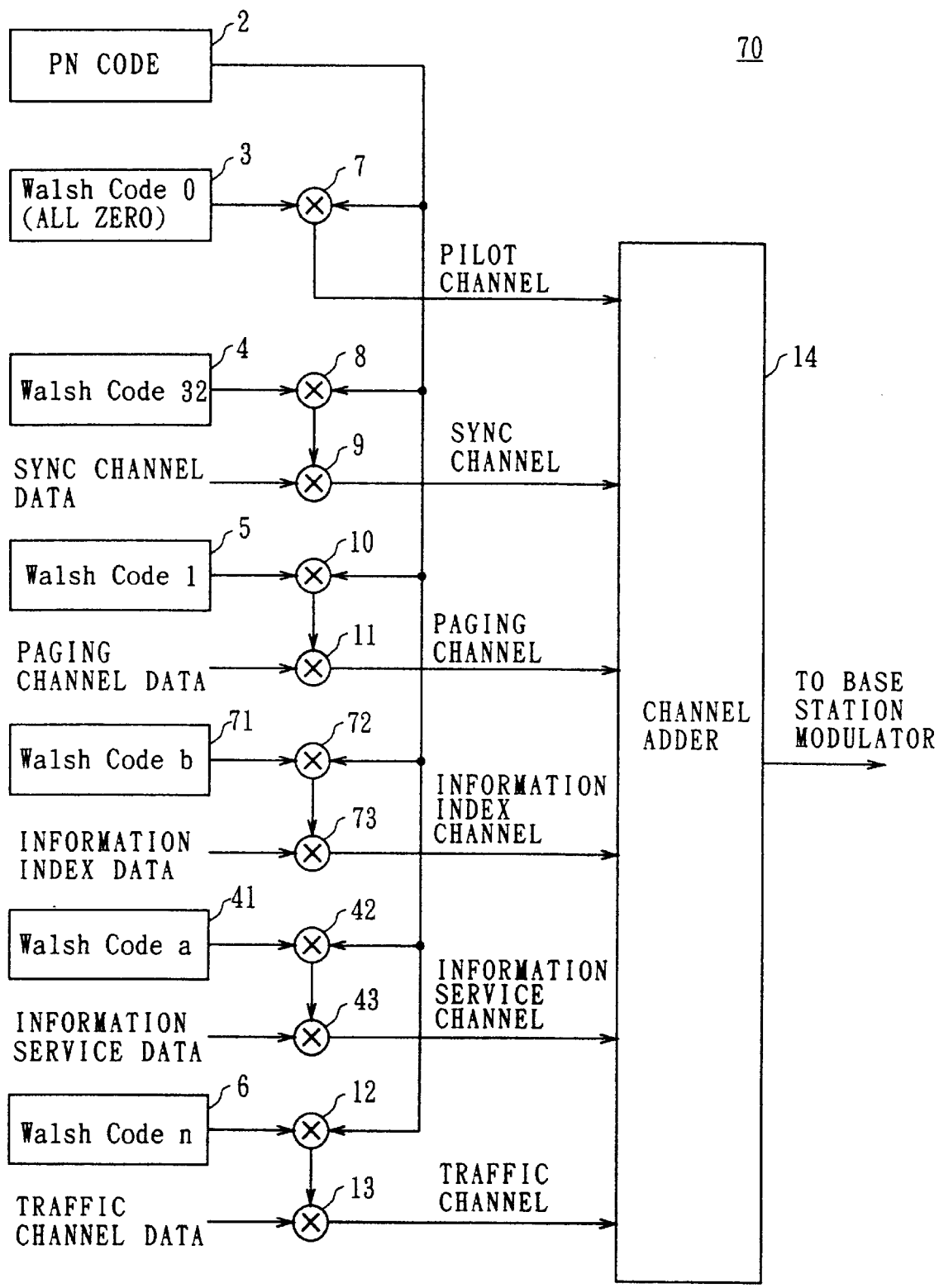
FIG. 12 is a block diagram showing the configuration of a transmission section in the case where information service data is transmitted by using the exclusive code channel.
Figure 13A:
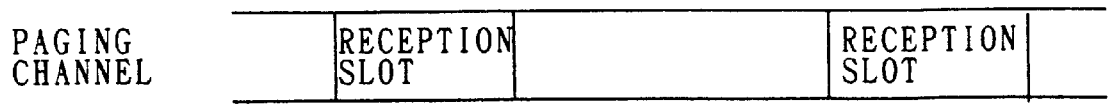
FIGS. 13A to 13D are schematic diagrams showing the operational timing of the mobile terminal device in the case where and information index packet is transmitted by using the exclusive code channel.
Figure 13B:
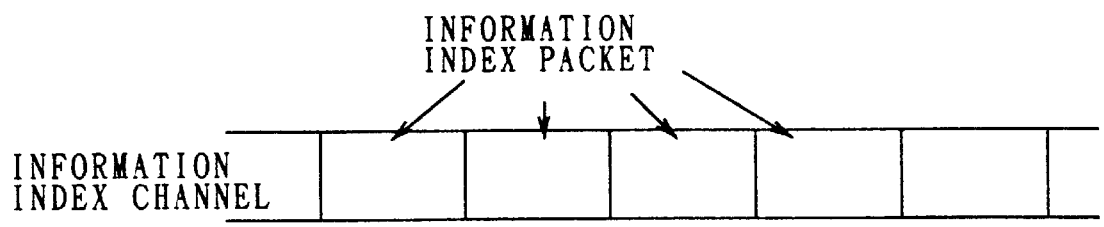
Figure 13C:
Figure 13D:
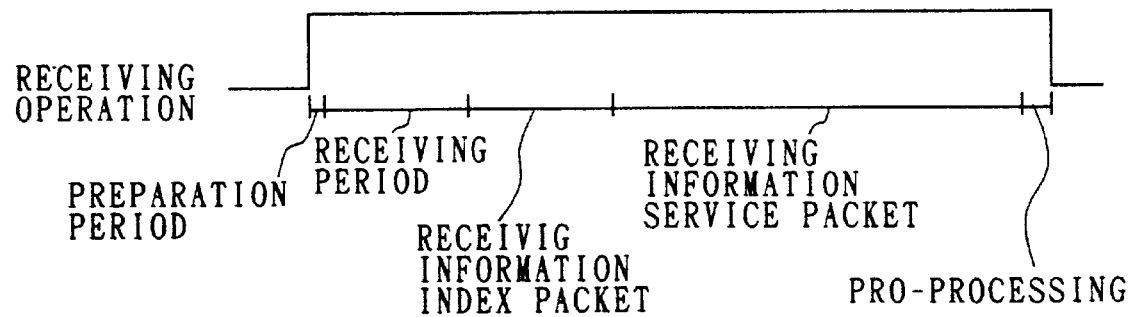

In the aforementioned embodiment, the information index packet is transmitted by using the paging channel, however, the present invention is not limited thereto and the exclusive code channel may be used to transmit the information index packet if the amount of traffic is large. In this case, the transmission section 70 in the base station unit may have an exclusive information index channel and use it to transmit the information index packet, as shown in FIG. 12. This enables the information index packet to be transmitted if the amount of traffic of the paging channel is large.

Here, the receiving operation timing of the mobile terminal device according to the above configuration will be described with reference to FIGS. 13A–13D, which show the case where the information service packet is sent by using the information service channel.

The mobile terminal device first receives a reception slot periodically transmitted to itself and examines whether or not there is a paging message for itself. If not and if the current timing is for receiving the information index packet, the mobile terminal device switches the code channel to be received from the paging channel to the information index channel in order to receive the information index packet. Based on the received information index packet (specifically, the version number of the information status included in the information index packet), the mobile terminal device examines whether or not the information service packet has been updated, and if so, switches the code channel to be received to the information service channel in order to receive the information service packet. This enables the provided information service data to be obtained.

In the aforementioned embodiment, the charge of provided information has not be particularly referred, however, the present invention is not limited thereto and provided information may be charged. In this case, when information is sent by connecting to the information service center, those mobile terminal devices which have received the information after connecting to the information service center can be charged as in the general telephone rate. When information is sent by using the exclusive code channel, the information service data is scrambled (that is, encrypted) so that it can be received by only those users who are permitted to do so under a contract and that the charge will be collected from only contracted users. When the information service data is scrambled, the control circuit 32 descrambles and decodes the data using a specified key. In this case, those mobile terminal devices which are not permitted cannot decode the received information service data due to the lack of the knowledge of the key, and cannot thus receive the provided information.

Further, in the aforementioned embodiment, the information to be provided is received and displayed on the display 52 as characters, however, the present invention is not limited thereto and the information can be output as sound by using a speaker when the information to be provided is sound information.

Further, in the aforementioned embodiment, the combination of the methods for transmitting information by using the information service channel and by connecting to the information service center, however, the present invention is not limited thereto and only one of the methods can be used to transmit the information to be provided.

Furthermore, in the aforementioned embodiment, the present invention is applied for providing information in the CDMA cellular, however, the present invention is not limited thereto and the present invention can be applied for providing information in radio communication systems which communicate in the code division multiple access method.

While the above system has been described in connection with the preferred embodiments of the invention, it will be obvious to those skilled in the art that various changes and modifications may be made and it is aimed, therefore, to cover in the appended claims all such changes and modifications as fall within the true spirit and scope of the invention.

What is claimed is:

1. A communication method for transmitting and receiving information between an information center and a communication terminal device via an intermediate station, comprising the steps of:

regularly transmitting over a first channel an information packet identifying a type of information to be provided and a version number from said information center to said communication terminal device via said intermediate station;

determining at said communication terminal device whether said type of information corresponds to a user requested information and whether said version number indicates that said user requested information has been updated;

communicating from said communication terminal device to said information center instructions concerning the type of information over a second channel outside of said first channel; and downloading said user requested information to said communication terminal device from said information center via said intermediate station over said second channel when a result of said step of determining is positive.

2. The communication method according to claim 1, wherein said user requested information is a weather forecast.

3. The communication method according to claim 1, further comprising the step of displaying said user requested information on a specified display.

4. A communication method for transmitting and receiving information between an information center and a communication terminal through an intermediate network, comprising the steps of:

transmitting from the information center over a first channel an information packet identifying information to be provided to said communication terminal through said intermediate network;

determining at said communication terminal whether the information to be provided is user desired information;

communicating from said communication terminal to said information center instructions concerning the information to be provided over a second channel outside of said first channel; and transmitting said information to be provided from said information center to said communication terminal via said intermediate network over said second channel in response to said instructions.

* * * * *